(12) United States Patent
Rautschek et al.

(10) Patent No.: US 7,566,750 B2
(45) Date of Patent: Jul. 28, 2009

(54) DEFOAMER COMPOSITIONS

(75) Inventors: Holger Rautschek, Nuenchritz (DE); Robert Schroeck, Altoetting (DE)

(73) Assignee: Wacker Chemie AG, Munich (DE)

( * ) Notice: Subject to any disclaimer, the term of this patent is extended or adjusted under 35 U.S.C. 154(b) by 516 days.

(21) Appl. No.: 11/327,980

(22) Filed: Jan. 9, 2006

(65) Prior Publication Data

US 2006/0160908 A1 Jul. 20, 2006

(30) Foreign Application Priority Data

Jan. 17, 2005 (DE) .................. 10 2005 002 163

(51) Int. Cl.
*C08L 83/04* (2006.01)

(52) U.S. Cl. .................... 524/588; 525/477

(58) Field of Classification Search ............... 524/588; 525/477
See application file for complete search history.

(56) References Cited

U.S. PATENT DOCUMENTS

| | | | |
|---|---|---|---|
| 2,632,736 A | 3/1953 | Currie et al. | |
| 4,639,489 A * | 1/1987 | Aizawa et al. | 524/588 |
| 2001/0044479 A1 | 11/2001 | Baba et al. | |

FOREIGN PATENT DOCUMENTS

| | | |
|---|---|---|
| DE | 1 519 987 | 4/1970 |
| DE | 15 19 987 B2 | 4/1970 |
| DE | 1 545 185 | 4/1971 |
| DE | 25 51 260 A1 | 5/1977 |
| DE | 100 01 945 A1 | 7/2001 |
| EP | 0 163 541 A2 | 12/1985 |
| EP | 0 434 060 A2 | 6/1991 |
| EP | 0 879 628 A1 | 11/1998 |
| EP | 0 887 097 A1 | 12/1998 |
| EP | 1 060 778 A1 | 12/2000 |

OTHER PUBLICATIONS

Freeman "Silicones—An Introduction To Their Chemistry and Applications" by Freeman (1962), Published for The Plastics Institute, p. 27.*
Polymeric Materials Encyclopedia, Edited by J. Salamone, (1996) p. 7764.*
Derwent Abstract Corresponding to DE 1 545 185, Apr. 1, 1971.
Derwent Abstract Corresponding to DE 15 19 987 B2, Apr. 9, 1970.
Derwent Abstract Corresponding to DE 25 51 260 A1, May 18, 1977.
Derwent Abstract Corresponding to DE 100 01 945 A1, Jul. 19, 2001.
Derwent Abstract Corresponding to EP 0 887 097 A1, Dec. 30, 1998.
Derwent Abstract Corresponding to EP 1 060 778 A1, Dec. 20, 2000.
Derwent Abstract Corresponding to DE 1 519 987, Apr. 9, 1970.

* cited by examiner

*Primary Examiner*—Kuo-Liang Peng
(74) *Attorney, Agent, or Firm*—Brooks Kushman P.C.

(57) ABSTRACT

Effective defoamers prepared without employing difficulty handable catalysts, contain an organopolysiloxane, a filler, and a very minor amount of water.

19 Claims, No Drawings

DEFOAMER COMPOSITIONS

BACKGROUND OF THE INVENTION

1. Field of the Invention

The invention relates to compositions based on organopolysiloxanes, to a process for preparing them, and to their use as defoamers.

2. Description of the Related Art

In numerous liquid systems, particularly aqueous systems which contain surface-active compounds either as desired or undesired constituents, it is possible for problems to occur as a result of foaming if these systems are contacted more or less intensively with gaseous substances. Such contact may occur, for example, during gassing of wastewater, during intensive stirring of liquids, during distillation, in washing or coloring operations, or during dispensing procedures. Foaming can be controlled by mechanical means or through the addition of defoamers. Siloxane-based defoamers have been found particularly appropriate.

Defoamer formulations based on siloxanes may be prepared, for example, in accordance with DE-B 1519987, by heating hydrophilic silica in polydimethylsiloxanes. In order to improve the activity of defoamer formulations of this kind, numerous proposals have been made. For instance, U.S. Pat. No. 2,632,736 provides improved defoamer formulations by carrying out partial crosslinking of the polysiloxane by heating in the presence of atmospheric oxygen. Similarly partly-crosslinked or branched polysiloxanes are described in EP-A 163 541 and EP-A 434 060. This route has the disadvantage that an additional, cost-consuming reaction step is necessary and that the defoamer formulations thus prepared, owing to their viscosity or even viscoelasticity, generally have poor handling properties.

Through the use of catalysts which promote the reaction between the filler and the silicone it is possible to improve the activity of the defoamers economically. DE-A 1545185 describes defoamer formulations having improved activity in alkaline media by preparation in the presence of acidic catalysts such as anhydrous Lewis acids, an example being solid, mortar-ground aluminum chloride. EP-A 163 541 describes the preparation of defoamer formulations in the presence of KOH as catalyst, the potassium hydroxide being reacted in an additional, costly and inconvenient step with polysiloxanes to first form a potassium siloxanolate, which is then added to the mixture of polysiloxanes and silica. DE-A 10001945 also describes the preparation of defoamer formulations with basic catalysts, which are used directly or as reaction products with siloxanes. The preparation of basic siloxanolates is costly and inconvenient, and the handling of anhydrous alkalis or Lewis acids such as aluminum chloride, is inconvenient in comparison to handling aqueous solutions, and more costly and risky as well. A further disadvantage of the use of catalysts is that with catalysts it is generally not possible to ensure the purity required for applications in pharmaceutical products or in foods, since the catalysts and their reaction products remain in the defoamer formulation.

SUMMARY OF THE INVENTION

It has now been surprisingly discovered that improved organopolysiloxane defoamer compositions are prepared from organopolysiloxanes, filler, and a small but effective amount of water. The compositions are preferably heated to a temperature in the range of 50° C. to 300° C.

DETAILED DESCRIPTION OF THE PREFERRED EMBODIMENT(S)

The invention thus provides compositions comprising
(A) at least one organopolysiloxane comprising units of the formula $$R_a(R^1O)_b SiO_{(4-a-b)/2} \quad (I),$$

in which
R can be identical or different and denotes hydrogen atom or a monovalent, SiC-bonded, optionally substituted hydrocarbon radical,
$R^1$ can be identical or different and denotes a hydrogen atom or a monovalent, optionally substituted hydrocarbon radical,
a is 0, 1, 2 or 3, and
b is 0, 1, 2 or 3, with the proviso that the sum a+b is less than or equal to 3, preferably being on average from 1.5 to 2.4, more preferably 1.8 to 2.3, and in particular 1.9 to 2.1, and the organopolysiloxanes are composed of 5 to 50,000, preferably of 5 to 10,000, and more preferably of 5 to 2000, units of the formula (I),
(B) 0.1 to 30 parts by weight, preferably 1 to 15 parts by weight, based in each case on 100 parts by weight of component (A), of at least one additive selected from
(B1) filler particles and/or
(B2) organopolysiloxane resin comprising units of the formula $$R^2_c(R^3O)_d SiO_{(4-c-d)/2} \quad (II),$$

in which
$R^2$ can be identical or different and denotes a hydrogen atom or a monovalent, optionally substituted, SiC-bonded hydrocarbon radical,
$R^3$ can be identical or different and denotes a hydrogen atom or a monovalent, optionally substituted hydrocarbon radical,
c is 0, 1, 2 or 3, and
d is 0, 1, 2 or 3, with the proviso that the sum c+d is less than or equal to 3, and in less than 50% of all units of the formula (II) in the organopolysiloxane resin the sum c+d is 2, and
(C) 0.005 to 1.0 part by weight of water, based on 100 parts by weight of component (A).

Examples of radicals R are the hydrogen atom, alkyl radicals such as the methyl, ethyl, vinyl, propyl, isopropyl, n-butyl, n-pentyl, cyclopentyl, n-hexyl, neo-hexyl, n-heptyl, norbornyl, 2-ethylhexyl, n-octyl, isooctyl, dodecyl, tetradecyl, hexadecyl and octadecyl radicals; substituted alkyl radicals such as the trifluoropropyl, cyanoethyl, glycidyloxypropyl, polyalkylene glycol propyl, aminopropyl or aminoethylaminopropyl radicals; unsaturated radicals such as the vinyl, methacryloyloxypropyl or allyl radicals; or aromatic radicals such as the phenyl, 2-phenylethyl, or 2-phenylpropyl radicals.

Preferably radical R is an optionally substituted hydrocarbon radical having 1 to 30 carbon atoms, more preferably a methyl, ethyl, cyclopentyl, n-octyl, norbornyl, phenyl, or 2-phenylpropyl radical, and in particular, the methyl radical. In the organopolysiloxane (A) preferably more than 50% of all radicals R are methyl radicals.

Examples of radicals R[1] are the examples given for radical R. Radical R[1] is preferably hydrogen atom or optionally substituted hydrocarbon radicals having 1 to 30 carbon atoms, more preferably a hydrogen atom or hydrocarbon radical having 1 to 4 carbon atoms, especially the methyl and ethyl radicals.

Examples of the organopolysiloxanes used as component (A) are linear and branched polyorganosiloxanes. Component (A) preferably comprises substantially linear organopolysiloxanes of the formula

where R is as defined above and m has a value of 5 to 2000. The organopolysiloxanes of the formula (III) used as component (A) in the compositions of the invention are preferably pure α,ω-trimethylsiloxydimethylpolysiloxanes or are polysiloxanes of the general formula

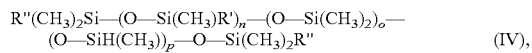

where
R' denotes identical or different hydrocarbon radicals having at least 2 carbon atoms,
R" can be identical or different and denotes R' or methyl radical,
n is an integer greater than 1,
o is 0 or a positive integer, and
p is 0 or a positive integer, with the proviso that the sum of n, o, and p has a value of 5 to 2000 and p/(n+o+p) is less than 0.1, in particular less than 0.01, more preferably 0.

Examples of radical R' are the examples specified for radical R of hydrocarbon radicals having at least 2 carbon atoms, preference being given to ethyl, cyclopentyl, hexyl, norbornyl, octyl, phenyl, 2-phenylethyl or 2-phenylpropyl radicals.

Although not depicted in formulae (III) and (IV), the polyorganosiloxanes used as component (A) may be branched as a result, for example, of the incorporation of $RSiO_{3/2}$ or $SiO_{4/2}$ units. These branched or part-crosslinked siloxanes then have viscoelastic properties. The organopolysiloxanes used in accordance with the invention as component (A) preferably contain not more than 2 mol % of $RSiO_{3/2}$ or $SiO_{4/2}$ units.

Examples of the organopolysiloxanes of the formula (IV) used in accordance with the invention are $Me_3Si$—O—$[SiMe_2$—O—$]_{40}$—$[SiMeC_{12}H_{25}$—O$]_{36}$—$SiMe_3$, $Me_3Si$—O—$[SiMeC_8H_{17}$—O$]_{25}$—$[SiMe(C_2H_3(CH_3)Ph)$—O$]_{25}$—$SiMe_3$, and $Me_3Si$—O—$[SiMeC_2H_5$—O$]_{40}$—$[SiMe(C_2H_3(CH_3)Ph)$—O$]_{10}$—$SiMe_3$, Me being methyl radical and Ph being phenyl radical.

A further preferred group of compounds which can be used as component (A) are organosilicon compounds comprising units of the general formula (I) in which R is a methyl radical and R[1] is a linear and/or branched hydrocarbon radical having at least 6 carbon atoms, b has on average a value of 0.005 to 0.5, and the sum (a+b) assumes on average a value of 1.9 to 2.1. Products of this kind are obtainable, for example, by alkali-catalyzed condensation of silanol-terminated polydimethylsiloxanes with a viscosity of 50 to 50,000 mPa·s at 25° C. and aliphatic alcohols having more than 6 carbon atoms, such as isotridecyl alcohol, n-octanol, stearyl alcohol, 4-ethylhexadecanol or eicosanol. The fraction of compounds of this kind as a proportion of component (A) is preferably up to 15 parts by weight, more preferably 0.5 to 5 parts by weight, based in each case on 100 parts by weight of the sum of all the organosilicon compounds used as component (A).

The organopolysiloxanes (A) used in accordance with the invention preferably have a viscosity of 10 to 1,000,000 mPas, more preferably 50 to 50,000 mPas, and most preferably 100 to 10,000 mPas, measured in each case at 25° C. The components (A) used in accordance with the invention are commercially customary products and/or can be prepared by processes which are known in silicon chemistry.

Additive (B) used in accordance with the invention may comprise exclusively component (B1), exclusively component (B2), or a mixture of components (B1) and (B2). Component (B1) preferably comprises pulverulent fillers, preferably hydrophobic fillers. Component (B1) preferably has a BET surface area of 20 to 1000 $m^2/g$, a particle size of less than 10 μm, and an agglomerate size of less than 100 μm.

Examples of component (B1) are silicon dioxide (silicas), titanium dioxide, aluminum oxide, metal soaps, quartz flour, PTFE powders, fatty acid amides such as ethylenebisstearamide, and finely divided hydrophobic polyurethanes.

As component (B1) it is preferred to use silicon dioxide (silicas), titanium dioxide or aluminum oxide having a BET surface area of 20 to 1000 $m^2/g$, a particle size of less than 10 μm, and an agglomerate size of less than 100 μm. Particularly preferred as component (B1) are silicas, especially those having a BET surface area of 50 to 800 $m^2/g$. These silicas may be pyrogenic (fumed) or precipitated silicas. As component (B1) it is possible to use both pretreated silicas, i.e., commercially customary hydrophobic silicas, and hydrophilic silicas. Examples of commercially customary hydrophobic silicas which can be used in accordance with the invention are HDK® H2000, a pyrogenic silica treated with hexamethyldisilazane and having a BET surface area of 140 $m^2/g$ (available commercially from Wacker-Chemie GmbH, Germany), and a precipitated silica treated with polydimethylsiloxane and having a BET surface area of 90 $m^2/g$ (available commercially under the name Sipernat® D10 from Degussa AG, Germany).

If hydrophobic silicas are to be used as component (B1), hydrophilic silicas may also be hydrophobicized in situ if this is advantageous for the desired activity of the defoamer formulation. Processes for hydrophobicizing silicas are well known. The hydrophobicization of hydrophilic silica can be accomplished in situ by, for example, heating the silica dispersed in component (A) or in a mixture comprising component (A), at temperatures of 100 to 300° C. for a number of hours. This reaction can be assisted by the addition of catalysts, such as KOH, mineral acids or trifluoromethanesulfonic acid, and of hydrophobicizers, such as short-chain, OH-terminated polydimethylsiloxanes, silanes or silazanes. This treatment is also possible when using commercially customary hydrophobic silicas, and may contribute to enhanced activity.

The use of catalysts and specific hydrophobicizers is objectionable particularly in the case of intended use of the antifoam agents of the invention in the food sector or in pharmacy, and is therefore not preferred in those cases.

A further possibility is to use a combination of silicas hydrophobicized in situ together with commercially customary hydrophobic silicas.

Component (B2) used optionally in accordance with the invention preferably comprises silicone resins comprising less than 30%, and preferably less than 5% of units of the formula (II), in which the sum of c+d is 2.

With particular preference component (B2) comprises organopolysiloxane resins composed essentially of $R^2_3SiO_{1/2}$ (M) units and $SiO_{4/2}$ (Q) units where $R^2$ is as defined above; these resins are also referred to as MQ resins. The molar ratio of M units to Q units is preferably in the range from 0.5 to 2.0, more preferably in the range from 0.6 to 1.0. These silicone resins may additionally contain up to 10% by weight of free hydroxyl or alkoxy groups.

Examples of radical $R^2$ are the radicals specified above for radical R. Preferably radicals $R^2$ are optionally substituted hydrocarbon radicals having 1 to 30 carbon atoms, more preferably hydrocarbon radicals having 1 to 6 carbon atoms, and in particular the methyl radical.

Examples of radical $R^3$ are the radicals specified for the radical $R^1$. Radical $R^3$ is preferably hydrogen atom or hydrocarbon radicals having 1 to 4 carbon atoms, especially hydrogen atom, methyl radicals or ethyl radicals.

The value of c is preferably 3 or 0.

Preferably these organopolysiloxane resins (B2) have a viscosity at 25° C. of greater than 1000 mPas or are solids. The weight-average molecular weight of these resins determined by gel permeation chromatography relative to a polystyrene standard is preferably 200 to 200,000 g/mol, in particular 1000 to 20,000 g/mol. Components (B2) are commercially customary products and/or can be prepared by processes which are common in silicon chemistry.

Where the additive (B) used in accordance with the invention is a mixture of components (B1) and (B2), the weight ratio of (B1) to (B2) in the mixture is preferably 0.01 to 50, more preferably 0.1 to 7.

Examples of varieties of water which can be used in accordance with the invention are natural waters, such as rainwater, groundwater, springwater, river water and seawater, chemical waters, such as fully demineralized water, distilled or (multiply) redistilled water, water for medical or pharmaceutical use, such as purified water (aqua purificata; Pharm. Eur. 3), aqua deionisata, aqua destillata, aqua bidestillata, aqua ad injectionam or aqua conservata, potable water in accordance with the German drinking water ordinance, and mineral waters. What grade of water is used as component (C) is likewise not critical but depends on the intended use. If, for example, the composition of the invention is to be used in the food industry or pharmacy, the use of purified water in accordance with the pharmacopeia is sensible. As water (C) it is preferred to use fully demineralized water and purified water, purified water being particularly preferred.

The compositions of the invention preferably contain water (C) in amounts of 0.01 to 0.5 part by weight, more preferably 0.02 to 0.1 part by weight, based in each case on 100 parts by weight of component (A).

Besides components (A) to (C) the defoamer formulations of the invention may comprise further substances (D) which are conventionally used hitherto in defoamer formulations. Examples of components (D) are organic or organosilicon compounds, surfactants, emulsifiers, solubilizers, preservatives, dyes, flavors, aromas, fillers, thickeners, carrier substances, and auxiliaries.

The organic or organosilicon compounds optionally used as component (D) are preferably water-insoluble organic compounds having a boiling point of greater than 100° C. under the pressure of the surrounding atmosphere, i.e., at 900 to 1100 hPa, especially those selected from mineral oils, natural oils, isoparaffins, polyisobutylenes, residues from the oxo alcohol synthesis, esters of low molecular weight synthetic carboxylic acids, fatty acid esters such as octyl stearate and dodecyl palmitate, fatty alcohols, ethers of low molecular weight alcohols, phthalates, esters of phosphoric acid, and waxes; and water-soluble organic compounds such as water-soluble polymers, polyvinyl alcohol for example, and organosilicon compounds other than components (A) and (B), such as silicic acids, organosilanes, and cyclic dimethylsiloxanes.

"Water-insoluble" for the purposes of the present invention is intended to denote a solubility in water at 25° C. under a pressure of 101.325 hPa of not more than 3 percent by weight.

Examples of surfactants used optionally as component (D) are organosilicon compounds other than components (A) and (B), which may be linear or branched and which carry at least one polyether moiety, or organic surfactants, such as ethoxylated alcohols.

Examples of thickeners used optionally as component (D) are any desired thickeners known hitherto, such as cellulose ethers and modified Bentonites.

Examples of carrier substances used optionally as component (D) are all conventional carrier substances from which it is possible to formulate, for example, powders such as zeolites, cellulose powders, and sodium sulfate.

Examples of auxiliaries used optionally as component (D) are basic organic or inorganic compounds, such as KOH or amines and their salts, acidic organic or inorganic compounds, such as sulfuric acid, phosphorus nitrile chloride or difluoromethanesulfonic acids and the salts thereof, and organometallic compounds.

The amount of component (D) which is optionally used may vary greatly and is guided essentially by the type of the component and also by the field of application of the compositions of the invention. Component (D), when employed, preferably comprises water-insoluble organic compounds and surfactants. The compositions of the invention preferably contain water-insoluble organic compound in amounts of 0 to 1000 parts by weight, more preferably 0 to 100 parts by weight, based in each case on 100 parts by weight of component (A).

The organosilicon compounds with polyether moieties that may be used as component (D) are preferably linear or branched siloxanes having SiC-bonded, pendant polyoxyethylene and/or polyoxypropylene groups, particular preference being given to polyether siloxanes branched via polyoxyethylene and/or polyoxypropylene groups. Polyether-modified compounds of this kind are known and are described for example in EP-A 1076073.

The compositions of the invention preferably contain these organosilicon compounds (D) in amounts of 0 to 50 parts by weight, more preferably 1 to 10 parts by weight, based in each case on 100 parts by weight of component (A).

The components used in the compositions of the invention may in each case be a single kind of such a component or else a mixture of two or more kinds of a respective component.

The compositions of the invention are preferably composed of
  (A) at least one organopolysiloxane comprising units of the formula (I),
  (B) 0.1 to 30 parts by weight, based on 100 parts by weight of (A), of at least one additive selected from
    (B1) filler particles and/or
    (B2) organopolysiloxane resin comprising units of the formula (II),
  C) 0.005 to 1.0 part by weight, based on 100 parts by weight of (A), of water, and
where appropriate
  (D) further substances.

With particular preference the compositions of the invention are composed of
  (A) at least one organopolysiloxane comprising units of the formula (I), (B) 0.1 to 30 parts by weight, based on 100 parts by weight of (A), of at least one additive selected from
(B1) filler particles and/or
(B2) organopolysiloxane resin comprising units of the formula (II),
(C) 0.005 to 1.0 part by weight, based on 100 parts by weight of (A), of water, and where appropriate
(D) water-insoluble organic compound.

If used in the food sector or in pharmacy the defoamer compositions of the invention preferably comprise as component (A) an α,ω-trimethylsiloxypolydimethylsiloxane and as component (B) a nonpretreated pyrogenic or precipitated silica, the compositions of the invention containing as impurities preferably less than 1000 ppm of metals, more preferably less than 300 ppm of metals, and also preferably less than 10 ppm of heavy metals. Metals here include all elements from main groups 1 to 3 of the Periodic Table with the exception of hydrogen, plus tin, lead, arsenic, antimony, and bismuth, and all transition group elements. Heavy metals include all metals detected when the defoamer is analyzed in accordance with the "Simethicones" monograph of the European Pharmacopeia.

The compositions of the invention are preferably viscous, clear to opaque liquids, and preferably have a viscosity of 10 to 1,000,000 mPas, in particular of 100 to 100,000 mPas, in each case at 25° C.

The compositions of the invention can be prepared by known processes, such as by mixing all of the components, employing, for example, high shearing forces in colloid mills, dissolvers or rotor-stator homogenizers. The sequence in which the individual components are mixed is not critical. Thus it is possible, for example, first to mix component (A) and (B) and then to add the water (C), followed by a further mixing operation. It is, however, also possible for the amount of water used to be present in one of the two components (A) and (B) or else proportionally in both components even prior to the mixing of the components. The optional additives (D) can be mixed together with (A)-(C). It is, however, also possible first to prepare a defoamer formulation from (A) to (C) and then, in a second step, to process this formulation further by addition of (D) to give a modified formulation.

The present invention further provides a process for preparing compositions of the invention, which comprises mixing together components (A), (B), and (C), and also, if used, (D), and heating the mixture at 50 to 300° C.

If filler particles (B1) are used as component (B) in the process of the invention it is possible to carry out hydrophobicization of (B1) in situ by heating the mixture at temperatures of 100 to 300° C. with the above-described catalysts and hydrophobicizers. This in situ hydrophobicization can be carried out simultaneously with the mixing of (A), (B), (C) and, if used, (D), or subsequently. It is nevertheless preferred not to use any catalysts.

In the course of the process of the invention, heating may take place during or after mixing. After the mixture has been heated, it can be homogenized again. The mixing of the invention is performed at temperatures of preferably 10 to 300° C., more preferably 20 to 200° C.

The process of the invention is performed under a pressure of preferably 1 to 300 hPa, more preferably 10 to 150 hPa. Mixing under reduced pressure is particularly preferred since it prevents the incorporation of air which is present, for example, in highly disperse fillers.

In one preferred embodiment of the process of the invention 100 parts by weight of component (A) are mixed with 0.1 to 30 parts by weight of (B) in the presence of 0.005 to 1.0 part by weight of water, and, if desired, further substances (D), with application of high shearing forces, for example, in colloid mills, dissolvers, rotor-stator homogenizers or else, for example, with high-pressure homogenizers, the mixing entailing an energy input of preferably at least 0.1 kJ/kg, more preferably of 1 to 10 000 kJ/kg, in particular of 5 to 1000 kJ/kg.

The process of the invention has the advantage that it is easy to carry out and highly economic. Furthermore, defoamer formulations prepared by this process exhibit a high activity in different surfactant systems. The compositions of the invention can be used wherever compositions based on organosilicon compounds have been employed to date. In particular they can be used as defoamers in any application requiring a defoamer. Thus, the present invention additionally provides a method of defoaming and/or preventing foam in media, which comprises mixing the compositions of the invention and/or compositions prepared in accordance with the invention with the medium.

The compositions of the invention can be added to the foaming media directly, in solution in suitable solvents, such as toluene, xylene, methyl ethyl ketone or tert-butanol, as a powder, or as an emulsion. The amount required to achieve the desired defoamer effect is governed, for example, by the nature of the medium, the temperature, and the turbulence that occurs.

Preferably the compositions of the invention are added in amounts of 0.1 ppm by weight to 1% by weight, in particular in amounts of 1 to 100 ppm by weight, to the foaming medium.

The process of the invention is preferably carried out at temperatures of −10 to +150° C., more preferably 5 to 100° C., under the pressure of the surrounding atmosphere, i.e., at about 900 to 1100 hPa. The process of the invention can also be carried out at higher or lower pressures, such as at 3000 to 4000 hPa or 1 to 10 hPa, for instance.

The defoamer formulations of the invention can be used wherever disruptive foam is to be prevented. This is the case, for example, in nonaqueous systems such as in tar distillation or in petroleum processing. In particular the defoamer formulations of the invention are suitable for controlling foam in aqueous surfactant systems, where they score over prior art defoamer formulations by a higher and longer-lasting activity in tandem with low effective amounts. They are employed, for example, in food applications such as potato washing, fermenting operations, or sugar production, applications in pharmacy, for example, in the fermentation of penicillin or as an antiflatulence agent, in detergents and cleaning products, in the control of foam in wastewater plants, in textile dyeing processes, in the scrubbing of natural gas, in polymer dispersions, and when defoaming aqueous media that are obtained in the production of cellulose.

It is also possible, using the compositions of the invention, to formulate powders or emulsions which are then added to the foaming fluid systems. The preparation of emulsions using defoamer formulations is known to the skilled worker. The compositions of the invention can also be formulated further to free-flowing powders. These are preferred, for example, in the case of application in pulverulent laundry detergents. The production of these powders starting from the mixture of components (A), (B), (C) and, where used, (D) takes place in accordance with processes that are known to the skilled worker, such as spray drying or agglomerative granulation, using adjuvants known to the skilled worker.

The powders prepared using the compositions of the invention contain preferably 2% to 20% by weight of components (A) to (D). Carriers employed include, for example, zeolites, sodium sulfate, cellulose derivatives, urea, and sugars. Further constituents of the powders of the invention may be waxes, for example, or organic polymers, as described for example in EP-A 887 097 and EP-A 1 060 778.

The present invention further provides detergents and cleaning products comprising the compositions of the invention and/or compositions prepared in accordance with the invention.

The compositions of the invention have the advantage that as defoamers they are easy to handle and that they are distinguished by a high and long-lasting activity in a wide variety of media in tandem with low amounts added. This is extremely advantageous both economically and environmentally.

In the following examples all parts and percentages are by weight unless indicated otherwise. Unless indicated otherwise the examples below are carried out under the pressure of the surrounding atmosphere, i.e., at about 1000 hPa, and at room temperature, i.e., about 20° C., or at a temperature which comes about when the reactants are combined at room temperature without additional heating or cooling, and also at a relative atmospheric humidity of 50%. All of the viscosity figures quoted in the examples relate to a temperature of 25° C.

The text below uses the abbreviations Me for methyl radical, Oct for n-octyl radical, Dd for dodecyl radical, Hd for hexadecyl radical, and Hex for n-hexyl radical.

The analytical determination of the amount of water in the compositions of the examples was carried out using the Karl Fischer titration method known to the skilled worker.

The following products were employed as component (A):

A1 A trimethylsiloxy-terminated polydimethylsiloxane having a viscosity of 1000 mPas;

A2 A trimethylsiloxy-terminated polydimethylsiloxane having a viscosity of 350 mPas;

A3 A trimethylsiloxy-terminated polydimethylmethylphenylsiloxane with 35 mol % (based on Si) of $Me_2SiO_{2/2}$ units and 62 mol % of $PhSi(Me)O_{2/2}$ units and with a viscosity of 1250 mPas;

A4 A polydimethylsiloxane with terminal $C_{20}$ alkoxy groups and a viscosity of 50 mPas;

A5 A trimethylsiloxy-terminated polydiorganosiloxane with 50 mol % of octylmethylsiloxy units, 48 mol % of 2-phenyl-propenylmethylsiloxy units and 2 mol % of hydromethylsiloxy units, and with a viscosity of 1570 mPas.

The following products were employed as component (B):

B11 A pyrogenic silica having a BET surface area of 200 $m^2$/g (available under the name HDK® N20 from Wacker-Chemie GmbH, Germany);

B12 A precipitated silica having a BET surface area of 165 $m^2$/g (available under the name Sipernat® 160 from Degussa AG, Germany);

B13 A pyrogenic silica having a BET surface area of 130 $m^2$/g (available under the name HDK® S13 from Wacker-Chemie GmbH, Germany); and B14 A pyrogenic, hexamethyldisilazane-treated silica having a BET surface area of 200 $m^2$/g (available under the name HDK® H2000 from Wacker-Chemie GmbH, Germany).

Tests of Defoamer Activity

The activity is characterized using the antifoam index AFI:

In an apparatus in accordance with DE-A 25 51 260, 200 ml of a 4% strength by weight aqueous solution of a sodium alkylsulfonate (available as Mersolat® from Bayer AG, Germany) containing 10 mg of the test defoamer (in solution in 10 times the amount of methyl ethyl ketone) are foamed for 1 minute using two counterrotating stirrers. Subsequently the collapse of the foam is recorded via a system of light barriers and evaluated using a PC. The area of the plot of foam height versus time is used to calculate the antifoam index. The lower this index, the more effective the defoamer.

EXAMPLE 1

100 parts of A1 are mixed with 1.5 parts of B11 and 5 parts of B12. 0.1 part of demineralized water is added to this mixture. The mixture is then homogenized using a dissolver disk at 1500 rpm for 5 minutes. An analyzed sample gave a water content of 0.08%. This mixture is baked at 150° C. for a period of 2 hours. This gave an opaque formulation having a viscosity of 2240 mPas. The activity of the defoamer formulation prepared is depicted in table 1.

EXAMPLE 2

The procedure described in example 1 is repeated with the modification that 0.5 part instead of 0.1 part of water is added, the analyzed water content of the mixture being 0.4%. An opaque formulation was obtained which had a viscosity of 2192 mPas. The activity of the defoamer formulation prepared is shown in Table 1.

COMPARATIVE EXAMPLE 1

The procedure described in example 1 is repeated with the modification that no water was added, less than 50 ppm of water being detectable in the mixture. An opaque formulation was obtained which had a viscosity of 2224 mPas. The activity of the defoamer formulation prepared is shown in Table 1.

TABLE 1

|  | Water content | AFI |
| --- | --- | --- |
| Example 1 | 0.08% | 2150 |
| Example 2 | 0.4% | 1370 |
| Comparative example 1 | <0.005% | 5120 |

EXAMPLE 3

100 parts of A2 are mixed with 5 parts of B13 and 2 parts of B14. 0.1 part of demineralized water is added to this mixture. The mixture is then homogenized using a dissolver disk at 1500 rpm for 5 minutes. An analyzed sample gave a water content of 0.03%. This mixture is baked at 150° C. for a period of 2 hours. This gave an opaque formulation having a viscosity of 1250 mPas. The activity of the defoamer formulation prepared is depicted in Table 2.

EXAMPLE 4

The procedure described in example 3 is repeated with the modification that 0.5 part instead of 0.1 part of water is added, the analyzed water content of the mixture being 0.04%. An opaque formulation was obtained which had a viscosity of 1344 mPas. The activity of the defoamer formulation prepared is shown in Table 2.

COMPARATIVE EXAMPLE 2

The procedure described in example 3 is repeated with the modification that no water was added, less than 50 ppm of water being detectable in the mixture. An opaque formulation was obtained which had a viscosity of 1480 mPas. The activity of the defoamer formulation prepared is shown in Table 2.

TABLE 2

|  | Water content | AFI |
|---|---|---|
| Example 3 | 0.03% | 1020 |
| Example 4 | 0.04% | 980 |
| Comparative Example 2 | <0.005% | 3990 |

EXAMPLE 5

100 parts of polysiloxane A3, 5 parts of polysiloxane A4, 3 parts of a silicone resin composed essentially of units of the general formula $Me_3SiO_{1/2}$— and $SiO_{4/2}$—, and 5 parts of silica B11 are mixed with one another. 0.1 part of demineralized water is added to this mixture. The mixture is then homogenized using a dissolver disk at 1500 rpm for 5 minutes. An analyzed sample gave a water content of 0.03%. This mixture is baked at 150° C. for a period of 4 hours. This gave an opaque formulation having a viscosity of 13,600 mPas.

The activity of the defoamer formulation prepared is depicted in Table 3.

EXAMPLE 6

The procedure described in example 5 is repeated with the modification that 0.5 part instead of 0.1 part of water is added, the analyzed water content of the mixture being 0.05%. An opaque formulation was obtained which had a viscosity of 16,800 mPas. The activity of the defoamer formulation prepared is shown in Table 3.

COMPARATIVE EXAMPLE 3

The procedure described in example 5 is repeated with the modification that no water was added, less than 50 ppm of water being detectable in the mixture. An opaque formulation was obtained which had a viscosity of 19 900 mPas. The activity of the defoamer formulation prepared is shown in Table 3.

TABLE 3

|  | Water content | AFI |
|---|---|---|
| Example 5 | 0.03% | 607 |
| Example 6 | 0.05% | 437 |
| Comparative example 3 | <0.005% | 1260 |

EXAMPLE 7

100 parts of polysiloxane A5, 5 parts of a silicone resin composed essentially of units of the general formula $Me_3SiO_{1/2}$— and $SiO_{4/2}$—, and 5 parts of silica B11 are mixed with one another. 0.1 part of demineralized water is added to this mixture. The mixture is then homogenized using a dissolver disk at 1500 rpm for 5 minutes. An analyzed sample gave a water content of 0.08%. This mixture is baked at 150° C. for a period of 4 hours. This gave an opaque formulation having a viscosity of 35,200 mPas. The activity of the defoamer formulation prepared is depicted in Table 4.

COMPARATIVE EXAMPLE 4

The procedure described in example 7 is repeated with the modification that no water was added, less than 50 ppm of water being detectable in the mixture. An opaque formulation was obtained which had a viscosity of 90 400 mPas. The activity of the defoamer formulation prepared is shown in Table 4.

TABLE 4

|  | Water content | AFI |
|---|---|---|
| Example 7 | 0.05% | 465 |
| Comparative example 4 | <0.005% | 1025 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A composition comprising
   (A) at least one organopolysiloxane comprising units of the formula $$R_a(R^1O)_b SiO_{(4-a-b)/2} \quad (I),$$

in which
   R are identical or different and are a hydrogen atom or a monovalent, SiC-bonded, optionally substituted hydrocarbon radical,
   $R^1$ are identical or different and are a hydrogen atom or a monovalent, optionally substituted hydrocarbon radical,
   a is 0, 1, 2 or 3, and
   b is 0, 1, 2 or 3,
   with the proviso that the sum a+b is a positive integer less than or equal to 3 and the organopolysiloxanes are composed of 5 to 50,000 units of the formula (I),
   (B) 0.1 to 30 parts by weight, based on 100 parts by weight of component (A), of at least one additive selected from
   (B1) filler particles and/or
   (B2) organopolysiloxane resin comprising units of the formula $$R^2_c(R^3O)_d SiO_{(4-c-d)/2} \quad (II),$$

in which
   $R^2$ are identical or different and are a hydrogen atom or a monovalent, optionally substituted, SiC-bonded hydrocarbon radical,
   $R^3$ are identical or different and are a hydrogen atom or a monovalent, optionally substituted hydrocarbon radical,
   c is 0, 1, 2 or 3, and
   d is 0, 1, 2 or 3,
   with the proviso that the sum c+d is less than or equal to 3 and in less than 50% of all units of the formula (II) in the organopolysiloxane resin the sum c+d is 2, and
   (C) 0.005 to 1.0 part by weight of water, based on 100 parts by weight of component (A) which is added to the remaining components.

2. The composition of claim 1, wherein component A comprises 5 to 10,000 units of the formula (I) and component (B) is present in an amount of 1 to 15 parts by weight.

3. The composition of claim 1, wherein component (A) comprises substantially linear organopolysiloxane(s) of the formula $$R_3Si-(O-SiR_2)_m-O-SiR_3 \quad (III)$$

where R is as defined above and m has a value of 5 to 2000.

4. The composition of claim 1, wherein component (A) comprises an α,ω-trimethylsiloxydimethylpolysiloxane.

5. The composition of claim 1, wherein component (A) comprises a polysiloxane of the formula

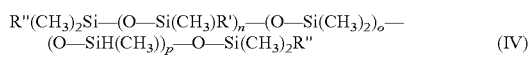 (IV)

where
R' are identical or different hydrocarbon radicals having at least 2 carbon atoms,
R" are identical or different and are R' or methyl radical,
n is an integer greater than 1,
o is 0 or an integer, and
p is 0 or an integer,
with the proviso that the sum of n, o, and p has a value of 5 to 2000 and p/(n+o+p) is less than 0.1.

6. The composition of claim 1, wherein component (A) comprises organosilicon compound(s) comprising units of the formula (I) in which R is a methyl radical and $R^1$ is a linear and/or branched hydrocarbon radical having at least 6 carbon atoms, b has on average a value of 0.005 to 0.5, and the sum (a+b) assumes on average a value of 1.9 to 2.1.

7. The composition of claim 1, which comprises:
(A) at least one organopolysiloxane comprising units of the formula (I),
(B) 0.1 to 30 parts by weight, based on 100 parts by weight of (A), of both
(B1) filler particles and
(B2) organopolysiloxane resin comprising units of the formula (II), and
(C) 0.005 to 1.0 part by weight, based on 100 parts by weight of (A), of water.

8. A process for preparing a composition of claim 1, which comprises mixing together components (A), (B), and (C), and any further components and heating the mixture at 50 to 300° C.

9. The process of claim 8, wherein mixing is performed at temperatures of 100 to 300° C.

10. A method of defoaming and/or preventing foam in a medium, which comprises mixing a composition of claim 1 with the medium.

11. In a laundry detergent or cleaning product wherein a defoamer is employed, the improvement comprising selecting as at least one defoamer, a composition of claim 1.

12. The composition of claim 1, wherein the sum of a+b on average is between 1.5 and 2.4.

13. The composition of claim 1, wherein filler particles (B1) are present and comprise hydrophobicized filler particles.

14. The composition of claim 1, wherein additive (B) consists of organopolysiloxane resin(s) (B2).

15. The composition of claim 1, wherein water is added in an amount of 0.01 to 0.5 parts by weight.

16. The composition of claim 1, wherein water is added in an amount of 0.02 to 0.1 parts by weight.

17. The composition of claim 3, wherein the organopolysiloxane(s) have a viscosity of 100 to 10,000 mPa·s.

18. The composition of claim 1 which contains both additives (B1) and (B2).

19. The composition of claim 18, wherein additive (B1) has been hydrophobicized.

* * * * *